Dec. 11, 1951  E. J. CORTSEN  2,577,951
RETRACTABLE WHEEL ARRANGEMENT FOR BAGGAGE
Filed April 10, 1950  2 SHEETS—SHEET 1

INVENTOR:
Eilet Johan Cortsen

Patented Dec. 11, 1951

2,577,951

UNITED STATES PATENT OFFICE 2,577,951

RETRACTABLE WHEEL ARRANGEMENT FOR BAGGAGE

Eiler Johan Cortsen, Copenhagen, Denmark

Application April 10, 1950, Serial No. 154,929
In Denmark April 13, 1949

3 Claims. (Cl. 280—37)

The present invention relates to improvements in baggage, such as trunks and large travelling bags, and the main object of the invention is to provide means by which it is possible to construct such baggage for wheeled transport with as little exertion as possible.

Another object of the invention is to provide baggage with wheels which, when not in use for wheeled transport, may be hidden away within the baggage, and which may quickly and easily be moved in and out of their operative position.

A further object of the invention is to provide the baggage with a mechanism for operating the transport means in and out of their operative position, which is relatively simple in design and cheap in construction.

A still further object of the invention is to provide a construction of such transport means that renders possible the steering of the transport members during wheel transport.

Finally the invention has as object the provision of means which may be used for steering purposes during wheeled transport and as carrying means when the transport members are in their inoperative position within the baggage.

Figure 1:
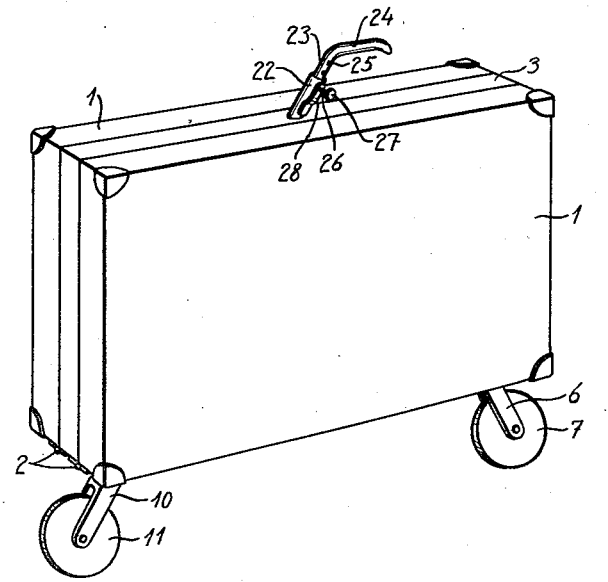
Figure 2:
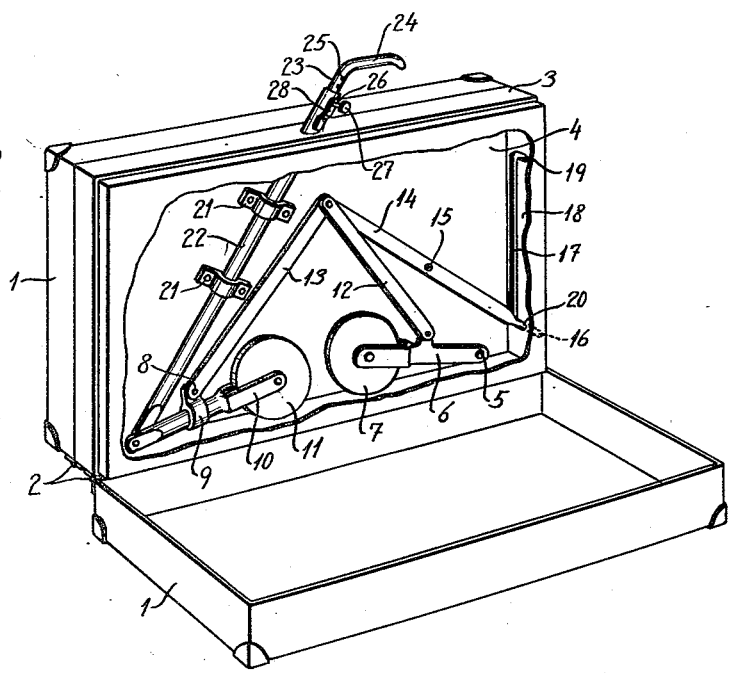
Figure 3:
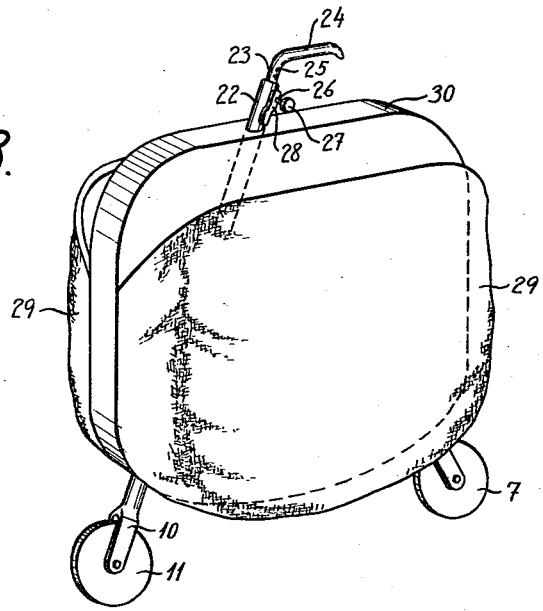
Figure 4:
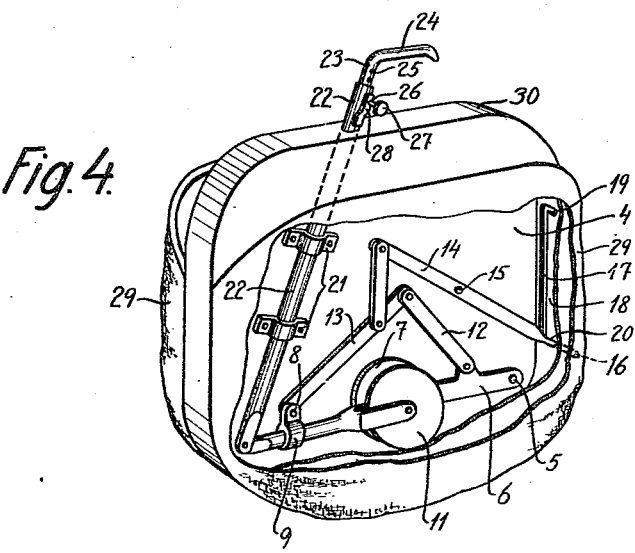

Two embodiments of the invention are illustrated in perspective views in the accompanying drawing, in which Fig. 1 shows a trunk in closed condition with its transport wheels displaced to operative position, Fig. 2 the trunk shown in Fig. 1 with one box part open and part of the wall of the adjoining intermediate compartment broken away to show wheels in their inoperative position within the intermediate compartment, Fig. 3 shows a large travelling bag with wheels in their operative position, and Fig. 4 shows the travelling bag illustrated in Fig. 3 with parts broken away to show the wheels in their inoperative position inside the separate compartment.

The trunk illustrated in Figs. 1 and 2 comprises two box compartments 1 connected by means of hinges 2 to each side of a separate intermediate compartment 3, to which the box compartments may be locked in closed position by means of any conventional lock (not shown). To the one interior wall 4 of the intermediate compartment 3 is attached a pivot pin 5 to which is rotatably attached the one end of a lever 6, which on its other end carries a rear wheel 7. A front wheel 11 is attached to the one end of another lever 10 which is slidable and rotatable within a sleeve 9 which by means of two pivotally interconnected links 12 and 13 is connected to the lever 6 between its ends. The pivotal connection between the said links 12 and 13 is pivotally connected to the one end of a two-armed lever 14 fulcrumed on a pin 15 attached to the wall 4. The other end of the lever 14 is shaped as a handgrip 16 which projects through and may slide along a vertical slit 17 in the one end wall 18 of the intermediate compartment 3 to be locked in either a lateral notch 19 at the upper end of the slit, or a lateral notch 20 at the lower end of the said slit.

To the wall 4 of the intermediate chamber 3 is furthermore attached two bearings 21 for a tubular rod 22. This rod is rotatable but not longitudinally displaceable in the bearings, and its lower end is pivotally attached to the free end of the lever 10 carrying the front wheel 11, and projects through an aperture in the top wall of the intermediate chamber where it has adjustably attached thereto a slidable but not rotatable rod 23 ending in a handle 24. The end of the rod 23 extending outside the compartment has a number of transverse holes 25 for a pin 26 provided with fingergrip 27 and connected to a leaf spring 28 attached to the outer side of tube 22.

When the handgrip 16 is moved upwardly to engage notch 19, the lever 14 will act upon the links 12 and 13 in such a manner that levers 6 and 10 will move the wheels 7 and 11 downwardly through an aperture in the bottom wall of the intermediate compartment 3 to their positions as shown in Fig. 1, in which position lever 10 will be in alignment with the tube 22, and the trunk may now be transported on its two wheels 7 and 11. Rod 23 with its handle 24 may be adjusted to a suitable height by extracting pin 26, 27, displacing the rod longitudinally in the tube, and again inserting the pin 26, 27 into the hole 25 now in position to engage the pin. Rod 23, tube 22 and lever 10 may now by means of the handle 24 be rotated to steer the trunk during transport.

After being transported on its wheels the trunk may be converted to be carried by hand. For this purpose the hand grip 16 is disengaged from notch 19 and moved down along slit 17 to engage the lower notch 20, which movement causes the wheels 7 and 11 to be returned to their initial positions within the intermediate compartment 3 as shown in Fig. 2. By means of pin 26, 27 the handle 24 is released and rod 23 is lowered and again locked in a position conveniently close to the top of the intermediate compartment, in which position the handle is used for carrying the trunk by hand.

The invention may be adapted to a travelling bag for instance as shown in Figs. 3 and 4. The bag shown consists of an intermediate compartment 30 made of any suitable rigid material, or provided with a rigid bracing. On each side of the intermediate compartment is attached a side pocket 29 of any convenient material and shape, with or without a hinged top. Inside the intermediate compartment 30 is arranged a mechanism corresponding in all details to that shown in connection with the trunk of Figs. 1 and 2, the only difference being the relative position of the various members necessitated by the general shape of the travelling bag. It will be understood that the above described manners of construction shall exclusively serve as examples of how the invention may be performed, and that the wheel operating mechanism may be adapted to any other shape of trunk or travelling bag without therefore departing from the scope of the invention:

I declare that what I claim is:

1. In a baggage with one or several baggage compartments, the arrangement of an extra compartment separated from the baggage compartments, a lever mechanism arranged within the extra compartment, two relatively interspaced transport wheels attached to the said lever mechanism for vertical displacement in and out of an aperture in the base of the extra compartment, supporting means for connecting the one transport wheel horizontally rotatable to the lever mechanism, an elongated steering member connected by its one end to the said horizontally rotatable transport wheel, its other end extending outside the upper end of the baggage, and a hand-actuated operating member extending with its one end outside the one end wall of the extra compartment, its other end being connected to the said lever mechanism for simultaneously displacing vertically the two transport wheels.

2. In a baggage with one or several baggage compartments, the arrangement of an extra compartment separated from the baggage compartments, a lever pivotally attached by its one end to the one interior wall of the extra compartment, a rear wheel mounted for rotation on the free end of the said lever, a front wheel rotatably mounted on the one end of an arm within the extra compartment, the other end of the arm being pivotally attached to the lower end of a tubular rod extending upwardly and projecting through the upper wall of the extra compartment, clamping means for attaching the said tubular rod rotatably but non-displaceable longitudinally to the interior wall of the extra compartment, a sleeve slidable and rotatable on the said arm, two pivotally connected link members interconnecting the sleeve and the rear wheel lever, and fulcrumed to the one interior wall of the extra compartment a two-armed lever pivotally connected by its one arm to the pivot joint of the said link members, its other arm projecting through and slidable along a vertical slit in one end wall of the extra compartment, said slit being provided with locking notches at each end for the projecting end of the lever arm.

3. A baggage as claimed in claim 2, in which the tubular rod in its upper end outside the extra compartment has inserted therein a longitudinally displaceable rod, a handle attached to the upper end of the rod, and adjustable means for fixing the said rod in a desired displaced position within the tubular rod.

EILER JOHAN CORTSEN.

REFERENCES CITED

The following references are of record in the file of this patent:

UNITED STATES PATENTS

| Number | Name | Date |
| --- | --- | --- |
| 44,936 | Clapp | Nov. 8, 1864 |
| 147,574 | Robinson | Feb. 17, 1874 |
| 1,808,864 | Pinheiro | June 9, 1931 |